United States Patent
Sugaya

(10) Patent No.: US 10,589,861 B2
(45) Date of Patent: Mar. 17, 2020

(54) DRONE CONTROL SYSTEM, METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 16/345,796

(22) PCT Filed: Oct. 31, 2016

(86) PCT No.: PCT/JP2016/082298
§ 371 (c)(1),
(2) Date: Apr. 29, 2019

(87) PCT Pub. No.: WO2018/078863
PCT Pub. Date: May 3, 2018

(65) Prior Publication Data
US 2019/0263524 A1    Aug. 29, 2019

(51) Int. Cl.
*B64C 99/00*    (2010.01)
*B64D 47/08*    (2006.01)
(Continued)

(52) U.S. Cl.
CPC ............. *B64D 1/18* (2013.01); *A01M 7/0042* (2013.01); *B64C 13/16* (2013.01); *B64C 39/02* (2013.01);
(Continued)

(58) Field of Classification Search
USPC ............................................................. 701/3
See application file for complete search history.

(56) References Cited

U.S. PATENT DOCUMENTS

| | | | |
|---|---|---|---|
| 2013/0134254 A1* | 5/2013 | Moore | B64D 1/16 244/17.11 |
| 2014/0303814 A1 | 10/2014 | Burema et al. | |

(Continued)

FOREIGN PATENT DOCUMENTS

| | | |
|---|---|---|
| JP | 2016-172498 | 9/2016 |
| JP | 2016-211973 | 12/2016 |
| WO | 2016-125422 | 8/2016 |

OTHER PUBLICATIONS nelsonships (Nelson ships), "About the new function "Waypoint" of Phantom 3", https://nelsonships.biz/2015/09/26/phantom3%e3%81%ae%e6%96%b0%e6%a9%9f%e8%83%bd%e3%80%8c%e3%82%a6%e3%82%a7%e3%82%a4%e3%83%9d%e3%82%a4%e3%83%b3%e3%83%88%e3%80%8d%e3%81%ab%e3%81%a4%e3%81%84%e3%81%a6/, Sep. 2015.

*Primary Examiner* — Tan Q Nguyen
(74) *Attorney, Agent, or Firm* — Lex IP Meister, PLLC

(57) ABSTRACT

A drone control system in which a drone can move to a position where a purpose can be achieved and performs an action according to the purpose is provided. The drone control system 1 controls a drone 10 capable of performing a predetermined action on a predetermined object, and includes a state data acquiring module 201 that acquires state data indicating a state of the object, a purpose data acquiring module 202 that acquires purpose data which is a purpose of moving the drone, and a detecting module 203 that detects an action point, which is position information at which an action for the purpose is executed, based on the acquired state data and purpose data.

12 Claims, 6 Drawing Sheets

(51) Int. Cl.
*B64D 1/18* (2006.01)
*A01M 7/00* (2006.01)
*B64C 39/02* (2006.01)
*G05D 1/00* (2006.01)
*B64C 13/16* (2006.01)
*B64D 1/16* (2006.01)

(52) U.S. Cl.
CPC .............. *B64C 39/024* (2013.01); *B64D 1/16* (2013.01); *B64D 47/08* (2013.01); *G05D 1/0094* (2013.01); *B64C 2201/12* (2013.01); *B64C 2201/146* (2013.01); *G05D 1/0016* (2013.01); *G05D 2201/0201* (2013.01)

(56) References Cited

U.S. PATENT DOCUMENTS

| | | | |
|---|---|---|---|
| 2014/0316616 A1 | 10/2014 | Kugelmass | |
| 2015/0344136 A1* | 12/2015 | Dahlstrom | B64C 39/024 701/3 |
| 2016/0082460 A1* | 3/2016 | McMaster | B05B 9/007 701/2 |
| 2016/0282872 A1* | 9/2016 | Ahmed | B64C 39/024 |
| 2016/0307448 A1* | 10/2016 | Salnikov | A01B 79/02 |
| 2016/0327946 A1* | 11/2016 | Koga | B64C 39/024 |
| 2019/0200600 A1* | 7/2019 | Sugaya | A01M 7/00 |

\* cited by examiner

FIG. 3

Action Determination Table

| Purpose data | Action data |
|---|---|
| Photographing object | Photographing : capturing a still image when arriving at an action point |
| Guarding object | Photographing : capturing a moving image up to a next action point if arriving at an action point |
| Inspecting object | Photographing : capturing a moving image for a predetermined period (30 seconds) when arriving at an action point |
| Spraying agrochemical to object | Agrochemical spraying : starting to spray an agrochemical when arriving at an action point |
| . | . |
| . | . |
| . | . |

DRONE CONTROL SYSTEM, METHOD, AND PROGRAM

TECHNICAL FIELD

The present invention relates to a drone control system, method and program for controlling a drone capable of performing a predetermined action on a predetermined object.

BACKGROUND ART

Conventionally, there is known a technique of designating a position called a waypoint and moving a drone so as to pass through the waypoint (see Non-Patent Document 1).

PRIOR ART DOCUMENT

Non-Patent Document

"About a new function 'waypoint" of Phantom 3", which is searched on Oct. 5, 2016 on the Internet, https://nelson-ships.biz/2015/09/26/phantom3%e3%81%ae%e6%96%b0%e6%a9%9f%e8%83%bd%e3%80%8c%e3%82%a6%e3%82%a7%e3%82%a4%e3%83%9d%e3%82%a4%e3%83%b3%e3%83%88%e3%80%8d%e3%81%ab%e3%81%a4%e3%81%84%e3%81%a6/

SUMMARY OF THE INVENTION

Technical Problem

However, in the technique disclosed in Non-Patent Document 1, the position called the waypoint must be set by a person in advance.

When moving the drone, the purpose of moving the drone (for example, visual inspection of a building, extermination of pests or the like) and the object of the purpose (for example, a building to be inspected when the purpose is the visual inspection of the building, a farm where pests are to be exterminated when the purpose is the extermination of pests, or the like) exist.

For this reason, it is desirable that the drone moves to the position where the purpose can be achieved and performs the action according to the purpose, regardless of the operator's setting, in accordance with the purpose of moving the drone and the object for the purpose.

In view of the problem, it is an object of the present invention to provide a drone control system, method and program capable of causing a drone to move to a position where a purpose can be achieved and perform an action according to the purpose.

Technical Solution

The present invention provides the following solutions.

An invention according to a first aspect provides a drone control system for controlling a drone capable of performing a predetermined action on a predetermined object, the drone control system including a state data acquiring unit that acquires state data indicating a state of the object, a purpose data acquiring unit that acquires purpose data which is a purpose of moving the drone, and a detecting unit that detects an action point, which is position information at which an action for the purpose is executed, based on the acquired state data and purpose data.

According to the first aspect of the invention, a drone control system for controlling a drone capable of performing a predetermined action on a predetermined object includes a state data acquiring unit, a purpose data acquiring unit, and a detecting unit. The state data acquiring unit acquires state data indicating a state of the object. The purpose data acquiring unit acquires purpose data which is a purpose of moving the drone. The detecting unit detects an action point, which is position information at which an action for the purpose is executed, based on the acquired state data and purpose data.

Accordingly, since the action point, which is the position information at which the action for the purpose is executed, is detected based on the state data indicating the state of the object and the purpose data which is the purpose of moving the drone, the action point according to the state and purpose of the object can be automatically detected, for example, even if an operator of the drone does not set the action point for causing the drone to execute the action.

Here, the invention according to the first aspect is a category of a system, but even in other categories such as a method or a program, exhibits the same action and effect.

Accordingly, it can be provided a drone control system, method and program capable of causing a drone to move to a position where a purpose can be achieved and perform an action according to the purpose.

An invention according to a second aspect provides a drone control system further including a movement control unit that controls the drone to move to the detected action point, in addition to the invention according to the first aspect.

According to the second aspect of the invention, since the drone can be controlled to move to the detected action point, the drone can automatically move along the action point, for example, even if the operator of the drone does not set a route according to the action point.

An invention according to a third aspect provides a drone control system further including an action control unit that controls the drone to execute the action corresponding to the purposed data when the drone has moved to the action point, in addition to the invention according to the second aspect.

According to the third aspect of the invention, the drone can be controlled to execute the action according to the purpose data when having moved to the action point. Accordingly, the drone can be controlled to automatically execute the action of the purpose according to the action point, for example, even if the operator of the drone does not cause the drone having moved to the action point to execute the action or set timing at which the action is executed.

An invention according to a fourth aspect provides a drone control system, wherein the purpose data includes a specific purpose which is any one of photographing the object, guarding the object, and inspecting the object, and the action control unit causes a camera provided in the drone to photograph the object when the purpose data indicates the specific purpose, in addition to the invention according to the third aspect.

According to the fourth aspect of the invention, when the purpose of moving the drone is any one of photographing the object, guarding the object, and inspecting the object, the camera provided in the drone can photograph the object in the action point. Accordingly, the object can be photographed automatically, for example, even if the operator of the drone does not cause the drone to move to the action point and then photograph the object, with the purpose of any one of photographing the object, guarding the object, and inspecting the object.

An invention according to a fifth aspect provides a drone control system, wherein the purpose data includes spraying an agrochemical to the object, and the action control unit cause a sprayer provided in the drone to spray the agrochemical to the object when the purpose data indicates spraying the agrochemical to the object, in addition to the invention according to the third aspect.

According to the fifth aspect of the invention, when the purpose of moving the drone indicates spraying the agrochemical to the object, the sprayer provided in the drone can spray the agrochemical to the object in the action point. Accordingly, the agrochemical can be sprayed to the object automatically, for example, even if the operator of the drone does not cause the drone to move to the action point and then spray the agrochemical to the object, with the purpose of spraying the agrochemical to the object.

Effects of the Invention

According to the present invention, it is possible to provide a drone control system, method and program capable of causing a drone to move to a position where a purpose can be achieved and perform an action according to the purpose.

BRIEF DESCRIPTION OF THE DRAWINGS

FIG. 3 is a diagram for explaining an action determination table 230 stored in a storage unit 22 of an operator terminal 20.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

Overview of Drone Control System

Figure 1:
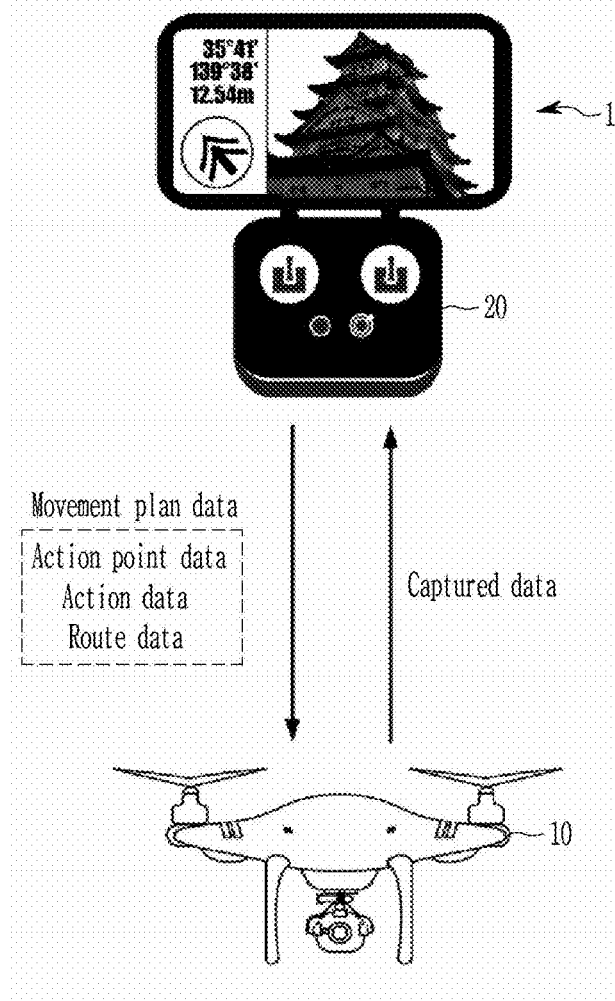
FIG. 1 is a diagram for explaining an overview of a drone control system 1 according to a preferred embodiment of the present invention.

FIG. 1 is a diagram for explaining an overview of a drone control system 1 according to an embodiment of the present invention. The overview of the drone control system 1 is described with reference to FIG. 1. The drone control system 1 controls a drone 10 capable of performing a predetermined action on a predetermined object.

In the present embodiment, the "predetermined action" is an operation that can be performed by a drone or a device (for example, a camera or an agrochemical spraying device) mounted on the drone, such as photographing or agrochemical spraying. The "predetermined object" is an object on which the predetermined action is performed, and is, for example, a building, a structure, a person, an animal, a farm, or the like.

The drone 10 can communicate with an operator terminal 20, and is an aircraft that generates a lift force and flies by rotating a plurality of rotors autonomously based on remote control by the operator terminal 20 or movement plan data transmitted from the operator terminal 20. In the present embodiment, a flight type is described as an example of the drone 10, but the drone 10 may be a vehicle type or a ship type.

The operator terminal 20 acquires state data indicating a state of the object. Here, for example, if the object is a building, the "state data" is 3D data of the building or position (for example, latitude/longitude) data of the building. Further, if the object is a farm, the "state data" is position (for example, latitude/longitude) data of the farm.

In addition, the operator terminal 20 acquires purpose data that is a purpose of moving the drone 10 based on an operation of an operator, and determines a predetermined action according to the acquired purpose data. Here, the "purpose" includes, for example, photographing the object, guarding the object, inspecting the object, spraying an agrochemical to the object, or the like.

Further, the operator terminal 20 detects an action point, which is position information at which an action for the purpose is performed, based on the acquired state data and purpose data.

Furthermore, the operator terminal 20 creates route data indicating a route including the detected action point as a passing point.

The operator terminal 20 then transmits, to the drone 10, action point data indicating the detected action point, action data indicating the determined action, and movement plan data including the created route data.

The drone 10 moves based on the movement plan data received from the operator terminal 20. Specifically, the drone 10 moves along the route based on the route data, and executes the predetermined action at the action point indicated by the action point data.

According to such a drone control system 1, since the action point, which is position information at which an action for the purpose is executed, is detected based on the state data indicating the state of the object and the purpose data which is the purpose of moving the drone 10, the action point according to the state and purpose of the object can be automatically detected, for example, even if the operator of the drone 10 does not set the action point where the drone 10 executes the action.

Therefore, the drone 10 can move to the position where the purpose can be achieved and perform the action according to the purpose.

Description of Each Function

Figure 2:
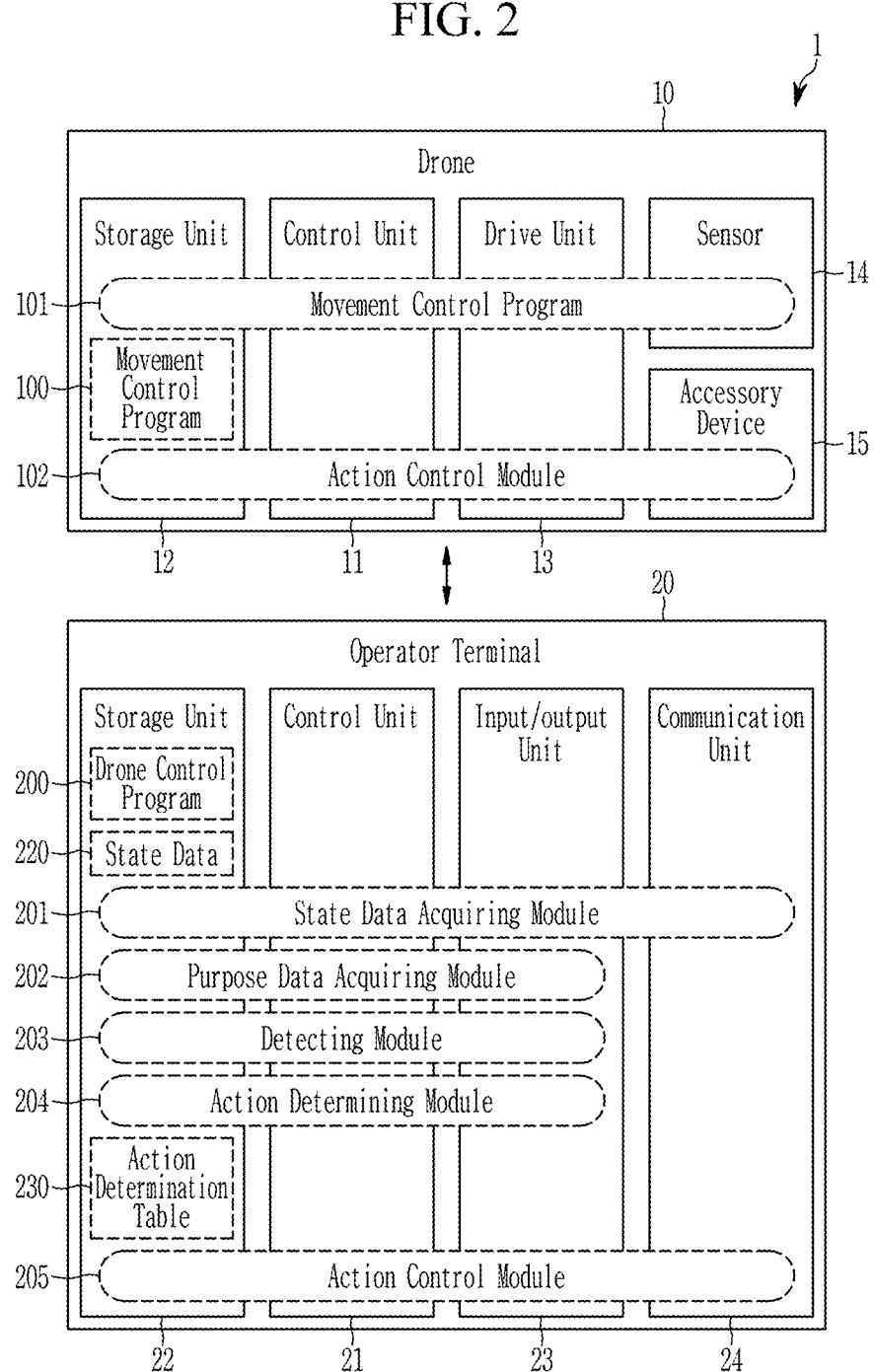
FIG. 2 is a diagram showing a relationship between a functional block of a drone control system 1 and each function.

FIG. 2 is a diagram showing a relationship between a functional block of a drone control system 1 and each function. The drone control system 1 includes a drone 10 and an operator terminal 20 capable of performing communication with the drone 10.

As shown in FIG. 2, the drone 10 includes, as a control unit 11, a CPU (Central Processing Unit), a RAM (Random Access Memory), a ROM (Read Only Memory), and the like, and also includes, as a storage unit 12, a data storage unit such as a hard disk or a semiconductor memory. Further, the drone 10 includes, for example, a plurality of rotary blades and a motor for rotating the rotary blades under control of the control unit 11, as a drive unit 13. Furthermore, the drone 10 includes, as a sensor 14, various sensors necessary for movement (a gyro sensor for detecting a direction in which the drone 10 accelerates, an altitude sensor for detecting an altitude of the drone 10, a geomagnetic sensor for detecting a direction in which the drone 10 is moving, or the like), and also includes, as an accessory device 15, a device necessary to execute an action (for example, a camera, an agrochemical spraying device, or the like). The storage unit 12 stores a movement control program 100 and other data necessary for control and movement of the drone 10.

In addition, although not shown, the drone 10 includes a battery for supplying power, a GPS (Global Positioning System) receiver for acquiring a current position, and a configuration necessary for unmanned flight, in addition to the above configuration.

In the drone 10, the control unit 11 reads the movement control program 100, thereby realizing a movement module 101 in cooperation with the storage unit 12, the drive unit 13, and the sensor 14. Further, in the drone 10, the control unit 11 reads the movement control program 100, thereby realizing an action control module 102 in cooperation with the storage unit 12, the drive unit 13, and the accessory device 15.

The operator terminal 20 includes a CPU, a RAM, a ROM, and the like as the control unit 21 and a data storage unit as the storage unit 22. Further, the operator terminal 20 includes, for example, a touch panel and the like as an input/output unit 23, and also includes, for example, a WiFi (Wireless Fidelity) compliant device compliant with IEEE 802.11, a wireless device compliant with the International Telecommunications Union standard such as a third generation or fourth generation mobile communications system, or the like, as communication unit 24. The storage unit 22 stores a drone control program 200, state data 220, an action determination table 230, and other data necessary to control the operator terminal 20.

The state data 220 is data of an object for detecting an action point which is position information at which the drone 10 executes an action. If the object is a building, the state data is 3D data of the building or position (for example, latitude/longitude) data of the building. Further, if the object is a farm, the state data is position (for example, latitude/longitude) data of the farm.

FIG. 3 is a diagram for explaining an action determination table 230 stored in a storage unit 22 of an operator terminal 20. In the action determination table 230, action data indicating an action to be executed by a drone 10 is associated with purpose data indicating a purpose of moving the drone 10. The action data is associated with an action (for example, photographing) to be executed by the drone 10 according to the associated purpose data and a detailed content of the action (for example, "capturing a still image when arriving at an action point"). Accordingly, even if the action is the same photographing, different detailed contents are associated if the purposes indicated by the purpose data are different. For example, although the purposes of "guarding an object" and "inspecting an object" are associated with the same "photographing" as the action, the detailed content of the "photographing" is associated with "capturing a moving image up to a next action point if arriving at the action point" in "guarding an object" and is associated with "capturing a moving image for a predetermined period (30 seconds) when arriving at the action point" in "inspecting an object".

Referring to FIG. 2 again, in the operator terminal 20, the control unit 21 reads the drone control program 200, thereby realizing a state data acquiring module 201 and a movement planning module 205 in cooperation with the storage unit 22, the input/output unit 23, and the communication unit 24. Further, in the operator terminal 20, the control unit 21 reads the drone control program 200, thereby realizing, a purpose data acquiring module 202, a detecting module 203, and an action determining module 204 in cooperation with the storage unit 22 and the input/output unit 23.

Drone Control Process

Figure 4:
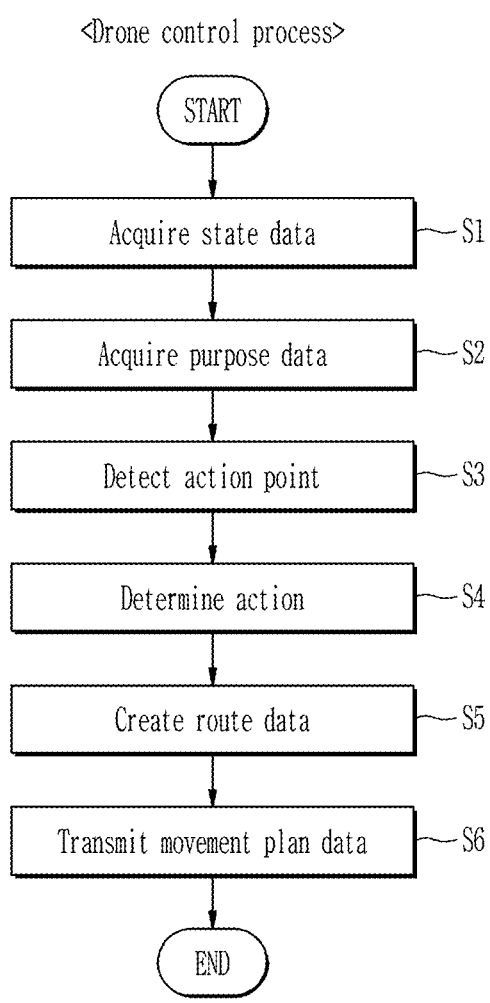
FIG. 4 is a flowchart of a drone control process executed by an operator terminal 20 of a drone control system 1.

FIG. 4 is a flowchart of a drone control process executed by an operator terminal 20 of a drone control system 1. The drone control process performed by the above-described various modules of a drone control system 1 is described.

In step S1, a state data acquiring module 201 acquires state data 220 indicating a state of an object. Specifically, the state data acquiring module 201 searches a storage unit 22 for 3D data or position data of the object designated based on an operation on an input/output unit 23 by an operator, and acquires the state data 220 of the object. In addition, when the 3D data of the object is not stored in the storage unit 22, the state data acquiring module 201 creates the 3D data of the object from captured data (for example, image data obtained by photographing the object or an surrounding environment of the object with a stereo camera) which is captured by the drone 10, and stores the 3D data in the storage unit 22. The processing of creating the 3D data from the captured data may be processed by an external server, and the state data acquiring module 201 may acquire the 3D data created by the external server.

In step S2, a purpose data acquiring module 202 acquires purpose data which is a purpose of moving the drone based on an operation on the input/output unit 23 by the operator.

In step S3, a detecting module 203 detects an action point, which is position information at which an action for the purpose is executed, based on the state data acquired by the state data acquiring module 201 in step S1 and the purpose data acquired by the purpose data acquiring module 202 in step S2.

Specifically, if the purpose is to photograph the whole, the detecting module 203 detects, as an action point, a position indicated by position data (for example, data indicating latitude/longitude or altitude) of the captured data stored in the storage unit 22 or the external server. Further, if the purpose is to inspect pipes of a building, the detecting module 203 detects, as an action point, a position indicated by position data of a position having a problem in the past, stored in the storage unit 22 or an external server. Furthermore, if the purpose is to guard the building, the detecting module 203 detects, as an action point, a position where a person or an animal can enter the inside of the building (for example, a position where a door or window provided between the inside and the outside is installed, or a position where a vent connecting the inside and the outside is installed) from the state data (3D data). In this case, it is preferable to use, as the 3D data, not only shape data but also 3D CAD data capable of recognizing members forming the building. In addition, if the purpose is to spray an agrochemical, the detecting module 203 detects, as an action point, a position indicated by position data of a position at which the agrochemical has been sprayed in the past, stored in the storage unit 22 or the external server.

In step S4, an action determining module 204 determines an action to be executed by the drone 10 at the action point detected by the detecting module 203 in step S3, by referring to an action determination table 230 (see FIG. 3) stored in the storage unit 22. Specifically, for example, if the purpose data acquired by the purpose data acquiring module 202 in step S2 is "photographing an object", the action determining module 204 determines, as the action to be executed by the drone 10, "photographing: capturing a still image when arriving at an action point" by referring to the action determination table 230 (see FIG. 3). Further, if the purpose data acquired by the purpose data acquiring module 202 in step S2 is "spraying an agrochemical to an object", the action determination table 230 determines, as the action to be executed by the drone 10, "agrochemical spraying: starting to spray an agrochemical when arriving at an action point" by referring to the action determination table 230 (see FIG. 3).

In step S5, a movement planning module 205 creates route data indicating a route including the action point detected in step S3 as a passing point.

In step S6, the movement planning module 205 transmits to the drone 10 movement plan data including action point data indicating the action point detected by the detecting module 203 in step S3, action data indicating the action determined by the action determining module 204 in step S4, and the route data created in step S5.

Figure 5:
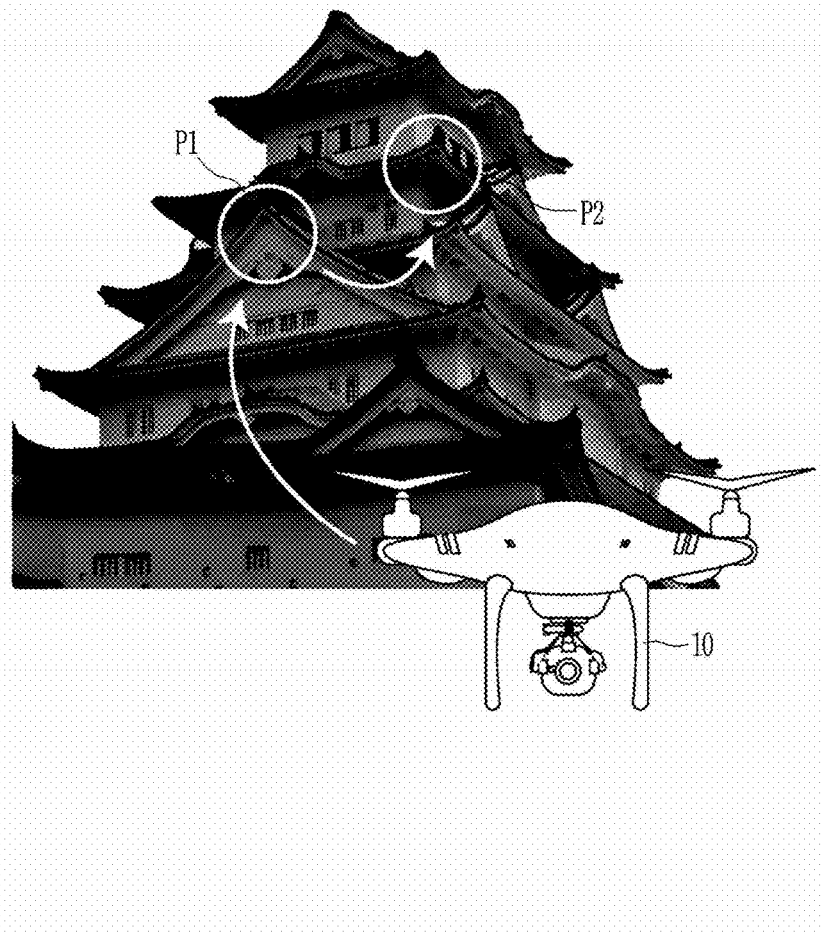
FIG. 5 is a diagram for explaining an example of an operation of a drone 10 in a drone control system 1.
Figure 6:
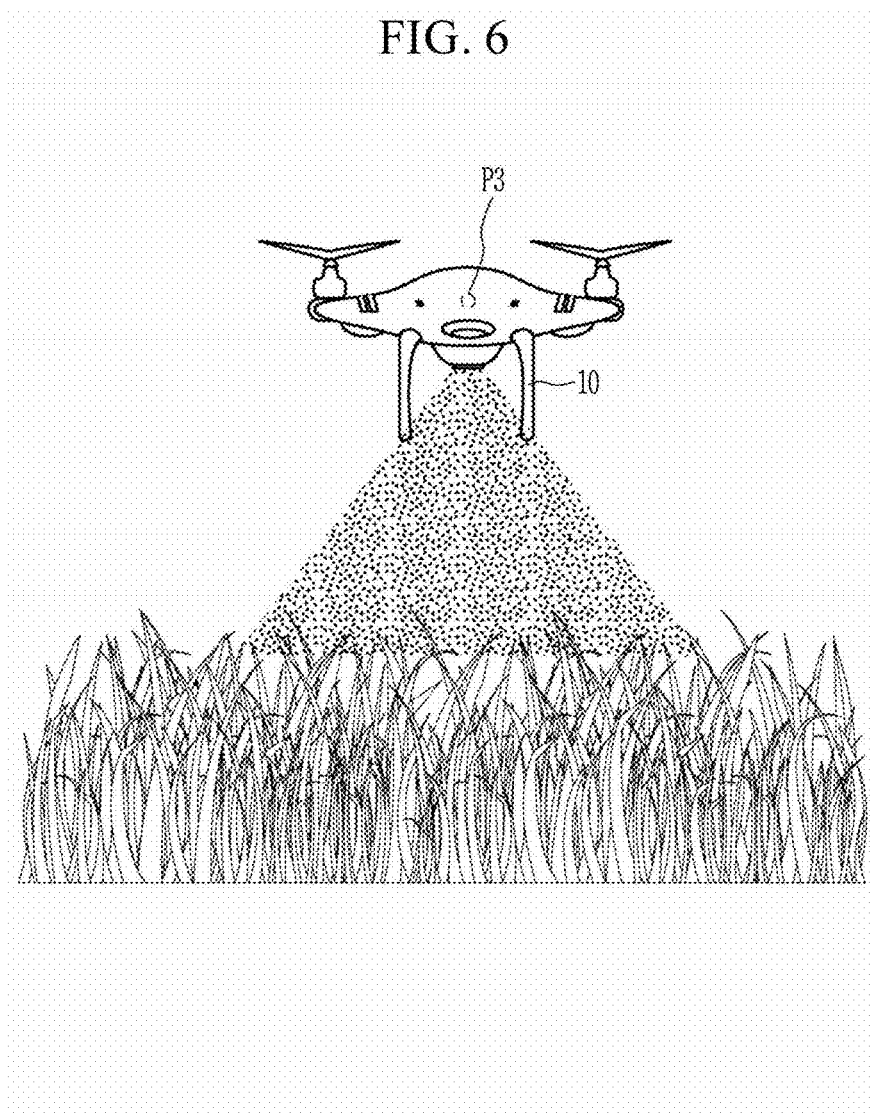
FIG. 6 is a diagram for explaining an example of an operation of a drone 10 in a drone control system 1.

FIG. 5 and FIG. 6 are diagrams for explaining an example of an operation of a drone 10 in a drone control system 1.

An example shown in FIG. 5 is a diagram showing a case where action point data includes action points P1 and P2 and action data is "photographing: capturing a still image when arriving at an action point" in movement plan data. In this case, a drone 10 moves along route data of the movement plan data (along arrows shown in FIG. 5) captures a still image when arriving at the action point P1, and then moves along the route data and captures a still image when arriving at the action point P2.

An example shown in FIG. 6 is a diagram showing a case where the action point data includes an action point P3 and the action data is "agrochemical spraying: starting to spray an agrochemical when arriving at an action point" in the movement plan data. In this case, the drone 10 moves along the route data of the movement plan data and starts to spray the agrochemical when arriving at the action point P3.

The above-described means and functions are realized by reading and executing a predetermined program by a computer (including a CPU, an information processing device, or various terminals). The program is provided, for example, in a form recorded in a computer-readable recording medium such as a flexible disk, a CD (e.g., CD-ROM or the like), a DVD (DVD-ROM, DVD-RAM, or the like), or the like. In this case, the computer reads the program from the recording medium and transfers the program to an internal storage unit or an external storage unit so as to be stored and executed. Furthermore, the program may be, for example, recorded in a storage device (recording medium) such as a magnetic disk, an optical disk, an optical magnetic disk, or the like in advance and be provided from the recording medium to the computer.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: drone control system, 10: drone, 20: operator terminal, 201: state data acquiring module, 202: purpose data acquiring module, 203: detecting module

What is claimed is:

1. A drone control system for controlling a drone capable of performing a predetermined action on a predetermined object, the drone control system comprising:
    a state data acquiring unit that acquires state data indicating a state of the object;
    a purpose data acquiring unit that acquires purpose data which is a purpose of moving the drone among a plurality of purpose data;
    a detecting unit that detects an action point according to the acquired state data and purpose data, the action point being position information at which the drone executes an action for the purpose when the drone arrives, and the action point of the drone varying depending on the acquired state data and purpose data;
    a movement control unit that controls the drone to move to the detected action point; and
    an action control unit that controls the drone to execute the action corresponding to the purposed data when the drone has moved to the action point,
    wherein the plurality of purpose data include spraying an agrochemical to the object, and
    wherein the action control unit cause a sprayer provided in the drone to spray the agrochemical to the object when the acquired purpose data indicates spraying the agrochemical to the object.

2. The drone control system according to claim 1, wherein the plurality of purpose data further include a specific purpose which is any one of photographing the object, guarding the object, and inspecting the object, and
    wherein the action control unit further causes a camera provided in the drone to photograph the object when the acquired purpose data indicates the specific purpose.

3. The drone control system according to claim 2, wherein the action control unit causes the camera to capture a still image when arriving at the action point in a case where the specific purpose indicates photographing the object,
    wherein the action control unit causes the camera to capture a moving image up to a next action point when arriving at the action point in a case where the specific purpose indicates guarding the object, and
    wherein the action control unit causes the camera to capture a moving image for a predetermined period when arriving at the action point in a case where the specific purpose indicates inspecting the object.

4. The drone control system according to claim 1, wherein the detecting unit automatically detects the action point according to the acquired state data and purpose data without setting the action point by an operator of the drone.

5. A method executed by a drone control system for controlling a drone capable of performing a predetermined action on a predetermined object, the method comprising:
    acquiring state data indicating a state of the object;
    acquiring purpose data which is a purpose of moving the drone among a plurality of purpose data; and
    detecting an action point according to the acquired state data and purpose data, the action point being position information at which the drone executes an action for the purpose when the drone arrives, and the action point of the drone varying depending on the acquired state data and purpose data;
    controlling the drone to move to the detected action point; and
    controlling the drone to execute the action corresponding to the purposed data when the drone has moved to the action point,
    wherein the plurality of purpose data include spraying an agrochemical to the object, and
    wherein controlling the drone to execute the action includes causing a sprayer provided in the drone to spray the agrochemical to the object when the acquired purpose data indicates spraying the agrochemical to the object.

6. The method according to claim 5, wherein the plurality of purpose data further include a specific purpose which is any one of photographing the object, guarding the object, and inspecting the object, and
wherein controlling the drone to execute the action includes causing a camera provided in the drone to photograph the object when the acquired purpose data indicates the specific purpose.

7. The method according to claim 6, wherein controlling the drone to execute the action includes causing the camera to capture a still image when arriving at the action point in a case where the specific purpose indicates photographing the object,
wherein controlling the drone to execute the action includes causing the camera to capture a moving image up to a next action point when arriving at the action point in a case where the specific purpose indicates guarding the object, and
wherein controlling the drone to execute the action includes causing the camera to capture a moving image for a predetermined period when arriving at the action point in a case where the specific purpose indicates inspecting the object.

8. The method according to claim 5, wherein detecting the action point includes automatically detecting the action point according to the acquired state data and purpose data without setting the action point by an operator of the drone.

9. A program, stored in a non-transitory computer-readable medium, for causing a computer controlling a drone control system for controlling a drone capable of performing a predetermined action on a predetermined object to function as:
a state data acquiring unit that acquires state data indicating a state of the object;
a purpose data acquiring unit that acquires purpose data which is a purpose of moving the drone among a plurality of purpose data; and
a detecting unit that detects an action point according to the acquired state data and purpose data, the action point being position information at which the drone executes an action for the purpose when the drone arrives, and the action point of the drone varying depending on the acquired state data and purpose data;
a movement control unit that controls the drone to move to the detected action point; and
an action control unit that controls the drone to execute the action corresponding to the purposed data when the drone has moved to the action point,
wherein the plurality of purpose data include spraying an agrochemical to the object, and
wherein the action control unit cause a sprayer provided in the drone to spray the agrochemical to the object when the acquired purpose data indicates spraying the agrochemical to the object.

10. The program according to claim 9, wherein the plurality of purpose data further include a specific purpose which is any one of photographing the object, guarding the object, and inspecting the object, and
wherein the action control unit further causes a camera provided in the drone to photograph the object when the acquired purpose data indicates the specific purpose.

11. The program according to claim 10, wherein the action control unit causes the camera to capture a still image when arriving at the action point in a case where the specific purpose indicates photographing the object,
wherein the action control unit causes the camera to capture a moving image up to a next action point when arriving at the action point in a case where the specific purpose indicates guarding the object, and
wherein the action control unit causes the camera to capture a moving image for a predetermined period when arriving at the action point in a case where the specific purpose indicates inspecting the object.

12. The program according to claim 9, wherein the detecting unit automatically detects the action point according to the acquired state data and purpose data without setting the action point by an operator of the drone.

* * * * *